June 28, 1966 E. J. LEVY ETAL 3,257,847
DETECTION METHOD AND APPARATUS FOR GAS CHROMATOGRAPH
Filed Aug. 1, 1963 2 Sheets-Sheet 1
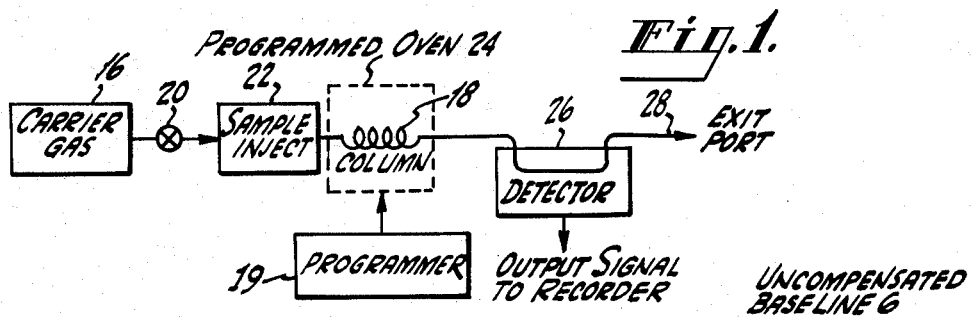
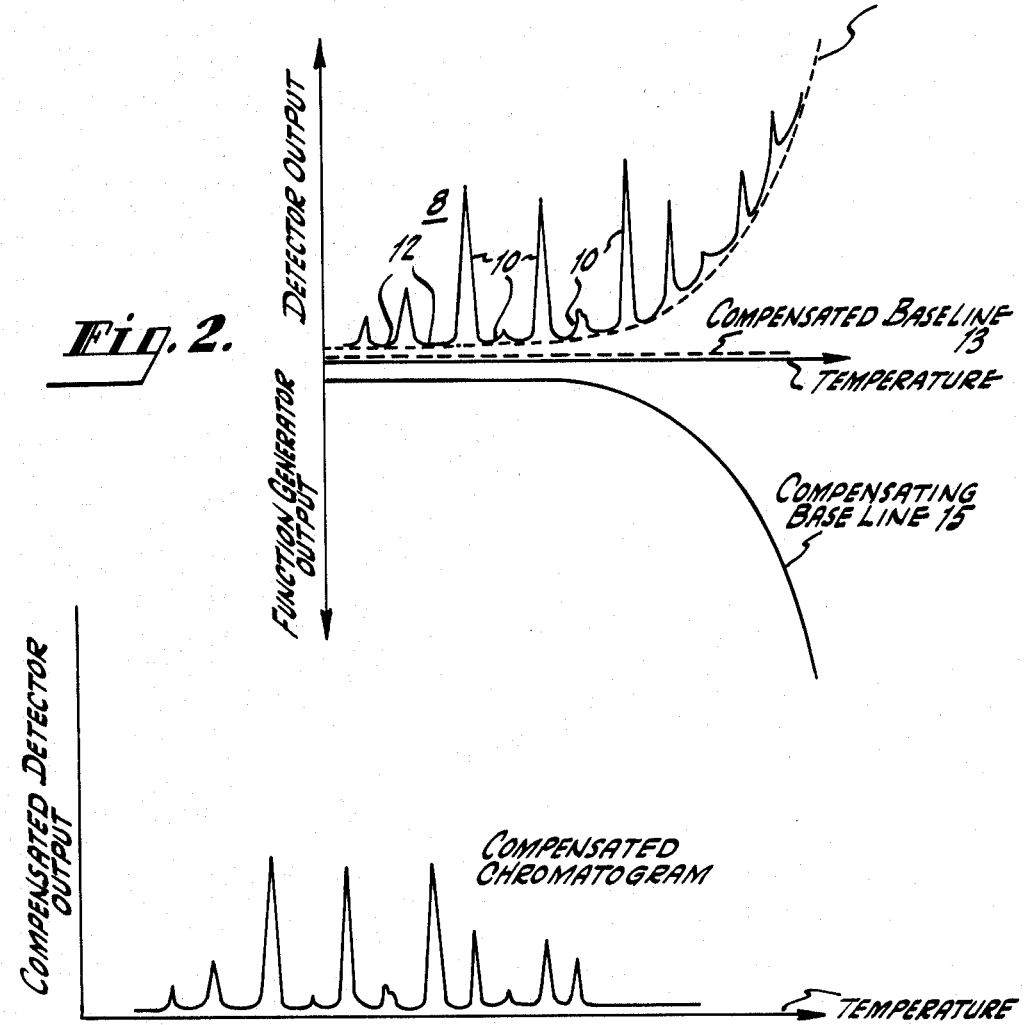
INVENTORS
EUGENE J. LEVY &
LOUIS MIKKELSEN
BY C. A. Weigel Jr
Attorney

INVENTORS
EUGENE J. LEVY &
LOUIS MIKKELSEN

BY
Attorney

United States Patent Office 3,257,847
Patented June 28, 1966

3,257,847
DETECTION METHOD AND APPARATUS FOR GAS CHROMATOGRAPH
Eugene J. Levy, Cherry Hill, N.J., and Louis Mikkelsen, Wilmington, Del., assignors, by mesne assignments, to Hewlett-Packard Company, Palo Alto, Calif., a corporation of California
Filed Aug. 1, 1963, Ser. No. 299,426
11 Claims. (Cl. 73—23.1)

This invention relates to gas chromatography and, more particularly, to a method and apparatus for compensating for the effect of changes in the temperature of a gas chromatograph separating column on its detector output signal.

A gas chromatograph is an analytical instrument that is used to separate in time and individually detect the several constituents of a sample to be analyzed. The gas chromatograph typically includes an analytical column, the inside of which is coated with a liquid stationary phase or packed with a finely divided solid material upon which is dispersed the liquid stationary phase. A carrier gas, or mobile phase, passes continuously through the column. The sample to be analyzed is injected into the carrier gas stream where it is vaporized and swept or carried through the column. The sample constituents are swept through the column at different velocities, depending upon their volatility and their chemical affinity for the liquid stationary phase. In this manner the sample constituents are separated in time. A detector is employed to detect the several separated constituents and the detector output signal typically is plotted as a function of time to produce what is termed a chromatogram. As each sample component is eluted from the column it produces a sharp increase in the detector output signal amplitude which appears as a peak or spike in the chromatogram.

The temperature of the column may be varied in accordance with a predetermined program to aid in separating the sample components. Separation of components is improved, but the changing temperature produces certain unwanted side effects particularly if columns having a liquid stationary phase are used. As the column temperature increases, the vapor pressure of the column's liquid phase, increases such that more of it is swept through the column to the detector. This phenomenon is referred to as "bleeding." The detector responds to this bleeding of the liquid phase such that an unwanted output signal is produced. When the amplitude of the detector output signal is plotted vs. time (temperature), the unwanted signal produces a rising response characteristic (termed baseline drift) even in the absence of a sample component. This rising response renders analysis of the chromatogram more difficult.

The effects of bleeding may be considerably reduced by the use of a reference column in addition to the analytical column. Carrier gas from a common source is passed through each column. The sample to be analyzed is passed through only the analytical column. Separate detector elements are positioned at the respective column outputs and the electrical signal provided by each detector element algebraically subtracted. This permits the cancellation of the unwanted background signals caused by variations in gas pressure, temperature, etc., and if the bleed characteristics of both columns are substantially the same, cancellation of the baseline drift.

This system has proven quite satisfactory in most cases but is of a relatively high cost in that a reference column and individual detector element for the reference column must be employed. Aside from the cost, the output signals provided by any two detector elements may be different. This difference between the output signals may result from a variety of factors. One of these factors is that the quantity of liquid phase from the two columns entering the detector elements may de different. In addition the operating characteristics of the two detector elements may be different. Whatever the cause, the result is imperfect cancellation of the baseline drift.

Accordingly, it is an object of the present invention to obviate many of the disadvantages inherent in prior art gas chromatographs because of column temperature variations.

Another object of this invention is to provide a novel method of compensating for the unwanted response of a gas chromatograph detector to variations in column temperature.

An additional object of this invention is to provide improved apparatus for compensating for the effect of temperature changes in the column of a gas chromatograph.

In accordance with the method of this invention the unwanted response of a gas chromatograph detector to column bleeding is reduced by generating a compensating electrical signal simulating the unwanted response and subtracting the simulated signal from the detector output signal, thereby compensating for the effects of column bleeding.

In a preferred embodiment of this invention the method of this invention may be followed using a function generator whose output signal varies in amplitude as a function of column temperature to provide the compensating signal. In another embodiment of this invention, the compensating signal amplitude may be varied as a function of time when the column temperature is also varied as a function of time.

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

FIGURE 1 is a schematic representation of a typical programmed temperature gas chromatograph;

FIGURE 2 is a plot of several different typical outputs of a gas chromatograph detector, each plotted as a function of the temperature of the separating column, to illustrate the effects of column bleeding as the column temperature is increased;

FIGURE 3 is a typical chromatogram (detector output vs. temperature) properly compensated in accordance with this invention for the effects of column bleeding;

Figure 5:
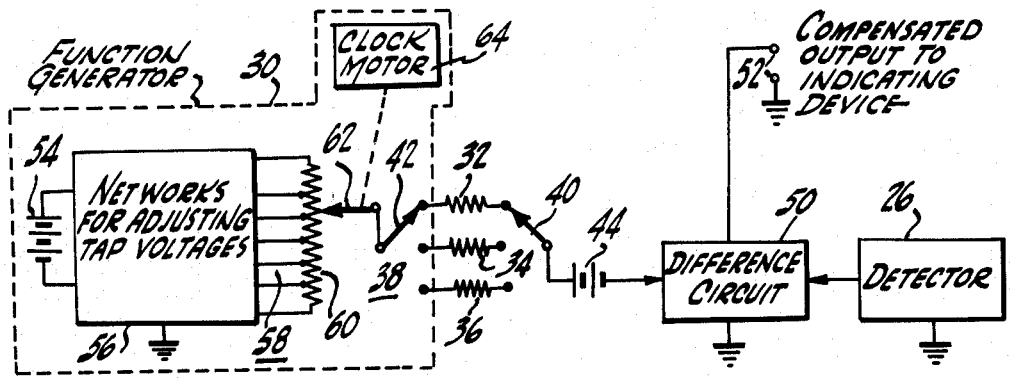
Figure 4:
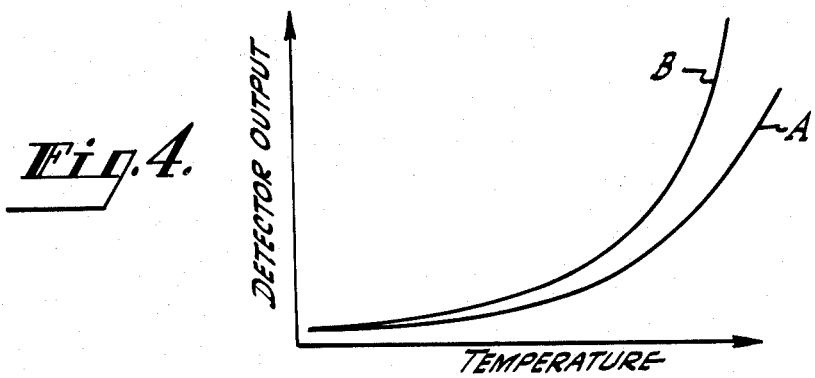
Figure 6:
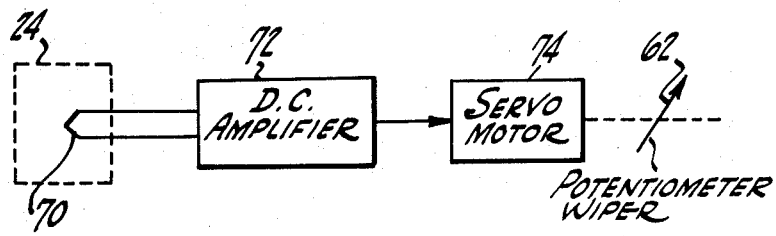

FIGURE 4 contains plots illustrating typical responses of different detectors to the outputs of their respective columns as a function of temperature;

FIGURE 5 is a part block and part schematic representation of a preferred apparatus for effecting the method of this invention; and FIGURE 6 is a partial block diagram of still another apparatus that is useful in following the method of this invention.

In FIGURE 1 there is illustrated a single column gas chromatograph of a conventional type. A source of carrier gas 16 is coupled through suitable tubing to an analytical chromatograph column 18. A control valve 20 may regulate the flow of the carrier gas through the column 18. Prior to passage through the column 18 the carrier gas is passed through a conventional sample injector 22 for introducing a gaseous or liquid sample into the column. The column 18 is enclosed in an oven 24 whose temperature may be varied or regulated in accordance with a predetermined program by a programmer 19. Any suitable programmer which is capable of varying the oven temperature as a function of time may be used.

From the sample injector 22, the carrier gas and sample, in gaseous or vapor phase, pass through the column 18. The column length, packing material, and separation characteristics will vary with the constituents of the sample to be analyzed. Typically the column is that part of the chromatograph which accomplishes the separation of the sample components and comprises a tube filled with an inert solid support material on which is dispersed a liquid which has a relatively low volatility at the typical operating temperatures of the column. The liquid is often termed the liquid phase. This combination of solid support and liquid phase constitutes the packing of a typical gas-liquid chromatograph column.

Certain of the sample components are dissolved in this liquid as the sample is swept through the column by the carrier gas. The separation of the sample's components depends on their differences in volatility in the solution. A detector 26 is placed at the output of the column 18 to measure any changes in composition of the column effluent. Any suitable detector such as a hydrogen flame ionization detector may be used. From the detector 26, the carrier gas and sample components are eluted to the atmosphere through an exit port 28. The detector provides an output electrical signal having an amplitude that varies in accordance with the sample components eluted from the column.

Whatever the detector, column packings, length of columns, or samples employed, it is often desirable to program the oven 24 such that its temperature gradually increases as a function of time to aid in separating the various sample components. Although the liquid phase is selected to have a low volatility, under increasing temperature conditions it tends to volatilize or bleed, be swept, along with the volatile sample, by the carrier gas out of the column. The volatilized liquid phase produces, unfortunately, an unwanted output signal in the detector 26. This output signal caused by column bleeding is illustrated in the plot of FIG. 2 in which the detector output signal amplitude is plotted as a function of temperature. The resulting curve 6 often is referred to as a bleed-line curve and actually represents the uncompensated reference or baseline of a typical chromatogram. It may be noted the bleedline curve 6 typically has a characteristic that rises as a function of temperature.

If a sample is injected under these conditions the resulting chromatogram (plot of the detector response vs. time or temperature) is illustrated by curve 8. The individual peaks 10 in curve 8 represent each of the constituents of the sample. As each of the sample constituents pass through the detector, the chromatogram peak returns to its reference level or baseline 12 which corresponds to the bleedline 6. The bleedline 6, as noted, gradually increases in height as a function of temperature due to column bleeding. Under normal operating conditions a temperature is reached at which the baseline 12 can be kept on the scale of the recorder, or within the range of the detector amplifier, only by reducing sensitivity. This reduces the temperature range permitted for programmed temperature operation. Also to use a chromatogram for quantitative sample analysis purposes, it is desirable to maintain, wherever possible, a flat baseline (curve 13) during programmed temperature gas chromatograph operation.

The most successful technique up to now for extending the temperature range permitted in programmed temperature operation and still maintaining flat baseline operation has been that of dual column compensation. The detector output signal from the second or reference column is subtracted from the analytical column detector output signal. If the two column detector combinations have substantially identical characteristics there is provided a compensated baseline illustrated by the flat curve 13 (FIG. 2) and a compensated chromatogram illustrated by the curve of FIG. 3.

Even though the analytical and reference columns of a dual chromatograph are carefully matched, matching of their bleed rates often is difficult if not impossible. Also the responses of the two separate detectors to the same quantity of material may differ. FIG. 4 illustrates typical differing responses to rising temperature of different detector-column combinations.

In accordance with the method of this invention the effects of column bleeding are obviated. This method permits flat baseline operation or matching of different column characteristics. It has been found that the bleed characteristics of a given column are repeatable. Hence, by (1) determining the bleed characteristic of a given column, (2) generating an electrical signal simulating this characteristic, and (3) subtracting the generated signal from the actual detector output signal during a sample analysis, the baseline drift caused by column bleeding is reduced.

The bleed characteristics of a particular column is easily determined by performing a sample run in the chromatograph without a sample, and varying the temperature of the column in accordance with a desired program. By recording the detector output signal, an uncompensated baseline characteristic illustrated by curve 6 (FIG. 2) is obtained. A function generator may then be adjusted to provide an output signal simulating the uncompensated baseline characteristic. The generated compensating signal may then be used repeatedly to compensate for the baseline drift caused by column bleeding.

If the particular temperature program is changed, the new bleed characteristic must be determined. Once it is determined, this characteristic may be used to compensate for the effects of bleeding on subsequent sample analyses. Once the bleed characteristic of a particular column-detector system and temperature program has been determined and simulated, it has been found to be valid for an extended period of time, typically for a 24 hour period. Any suitable apparatus may be employed for effecting the method of this invention. For example, the bleed characteristic may be recorded and played back when needed to compensate.

A preferred apparatus for effecting the method of this invention is illustrated in FIG. 5. In this figure there is shown a function generator denoted by the dotted rectangle 30. The output of the function generator 30 is connected to one switch arm 42 of a two deck switch 38. Three different range adjusting resistors 32, 34, and 36 are connected between corresponding contacts on the decks of the switch 38. The remaining switch arm 40 is connected through the positive terminal of a nulling battery 44 to one input of a difference circuit 50. The battery 44 may be omitted if not required to balance out the detector's quiescent voltage. The output of the detector 26 (FIG. 1) is connected to the remaining input of the difference circuit 50. The output of the difference circuit representing the algebraic sum of its two input signals, may then be connected to a suitable indicating device such as a chart type recorder.

The difference circuit 50 may be any suitable circuit for effecting the algebraic addition of the amplitudes of two electrical signals. The circuit may comprise for example a pair of equal value resistors connected to a common point which represents the output. In this situation opposite polarity signals are connected to the two inputs which are then effectively subtracted. In the alternative the difference circuit 50 may take the form of a differential amplifier which type circuits are well known in the art. In the event the detector 26 is a flame ionization type detector, such that it requires an electrometer amplifier, the input of this amplifier may be connected to the difference circuit 50. If the detector is the termal conductivity type, the output of the detector may be connected directly to the difference circuit.

In the preferred embodiment of the invention, the function generator 30 may comprise a battery 54 which is connected across a plurality of networks (illustrated by the rectangle 56) for providing adjustable tap voltages. The outputs of each of these networks is connected to a different one of the taps, illustrated generally as 58, of a tapped potentiometer 60 having a wiper 62. The wiper 62 is connected to be moved along the length of the potentiometer 60 by a clock motor 64. As the wiper 62 is moved along the potentiometer 60 by clock motor 64, the voltage between wiper and ground varies as a function of time and the amplitude of the tap voltages.

Typical circuits that are suitable for generating functions are described, for example, in the book, "Electronic Analog Computors" by Korn and Korn, second edition published 1956 by McGraw-Hill Book Co., on page 321 et seq. By adjusting individual networks in the block 56 an electrical signal corresponding to any desired function of time may be generated at the output of the function generator 30.

Using the apparatus illustrated in FIG. 5, the chromatograph of FIG. 1 is run under a typical temperature program under which it is desired to perform analyses. At the beginning of the run, when the temperature is at a stable value, the switch 38 is adjusted to select a particular range of operating conditions desired to permit the detector signal 26 to operate within the range of the output indicating device, such as a recorder, which may be connected at terminals 52. Next the clock motor 64 (FIG. 5) and the programmer for the chromatograph of FIG. 1 are each turned on and the trace recording on the recording device is observed. As this trace recording, which will represent the baseline 12 of a typical chromatogram (FIG. 2), begins to drift or rise from its normal quiescent value, the voltage of the first of the taps 58 is varied by an amount necessary to return this volage back to its zero or quiescent level. As the variable tape continues on down the potentiometer 60, the voltages at the successive taps are adjusted as are necessary to maintain the baseline at its quiescent position on the recorder graph paper. This run is continued until the programmed temperature operation ceases.

Now, if it is desired to analyze a sample under this particular program, it is merely necessary to insert the sample, reset the programmer 19 and the clock motor 64 to their initial positions, and turn them on. The function generator 30 by the adjustment procedure just described will now generate an output signal which simulates the baseline drift produced by column bleeding and will compensate for it. If during continued operation of the chromatograph on successive runs, the baseline tends to drift to any extent it may be readily compensated during operation of the device merely by readjusting the particular tap voltage of the potentiometer 60 so as to bring the recorded trace back to its zero or reference level as denoted in FIG. 3. It has been found, however, that once an adjustment of the function generator has been made this adjustment may be used for at least a 24 hour period without appreciable readjustment. The function generator has thus automatically determined the bleed characteristic of the particular column-detector combination, and its output signal, being of opposite polarity to that provided by the detector 26, compensates for such baseline drift. The compensated output illustrated in FIG. 3 thus has a relatively flat baseline characteristic which facilitates the analysis of the sample components.

This invention is equally applicable to compensating for the effects of rising or falling column temperatures. In either case all that need be done is to obtain the bleedline characteristic of a particular column, duplicate this characteristic by the function generator 30 and subtract this duplicated characteristic from the actual detector output signal during subsequent runs. Also it may be used to aid in matching any differences between the bleed characteristics of the analytical and reference columns in a dual column system.

In still another embodiment of the invention the function generator may take the form of that illustrated in FIG. 6. In FIG. 6 the temperature of the oven 24 (FIG. 1) is detected by a thermocouple 70. The output of this thermocouple 70 is connected to a D.C. amplifier 72, the output of which may drive a servo motor 74 which in turn positions the potentiometer wiper arm 62 of the function generator 30. The embodiment shown in FIG. 6 has a particular advantage in that the output signal is generated strictly as a function of temperature of the oven (and hence of the column) and does not make the assumption that the column temperature is a function of time. As is well known, the oven temperature may not always follow precisely the programmed temperature. The embodiment of FIG. 6 may find use in those applications not necessarily involving a programmed temperature operation but in which the environment of the chromatograph is such that its column temperature may be subjected to certain repeatable variations.

In another embodiment of this invention the function generator may take the form of a recording device in which the bleedline characteristic of a column may be recorded, such as on magnetic tape, by suitable amplitude modulation techniques. Then the recorded bleedline characteristic merely need be reproduced and coupled to the difference circuit 50 (FIG. 5) to provide the compensated chromatogram (FIG. 3).

There has thus been described a novel method and apparatus for reducing the effects of column bleeding on the detector output of a gas chromatograph. This method and apparatus has a particular advantage in that only a single column is required to provide sample analyses having a relatively flat baseline response characteristic.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. In a gas chromatograph having a separating column and a gas detector for providing an output electrical signal whose amplitude varies in accordance with the composition of the effluent from the column, said column having a liquid phase which volatilizes as a function of column temperature thereby producing unwanted variations in the detector output signal amplitude, the combination of means for generating an electrical signal having an amplitude that varies as a function of temperature in substantially the same manner as the temperature-produced amplitude variations in said detector output signal, and means for combining said generated electrical signal and said detector output signal in opposition, thereby to produce a compensated detector output signal substantially free from the column temperature-produced variations.

2. In a gas chromatograph for analyzing a sample, said chromatograph having a separating column and a gas detector for providing an output electrical signal whose amplitude varies in accordance with the composition of the effluent from the column, said column having a liquid phase which volatilizes as a function of column temperature thereby producing unwanted variations in the detector output electrical signal amplitude, the combination of means to vary the temperature of said column as a predetermined function of time, means for generating a compensating electrical signal whose amplitude varies as said predetermined function of time thereby to simulate the time varying amplitude of said detector output signal in the absence of a sample, and means for subtracting said generated electrical signal from said detector output signal, thereby to produce a compensated detector output signal substantially free from said column temperature-produced variations.

3. In a gas chromatograph having a separating column and a gas detector for providing an output electrical signal whose amplitude varies in accordance with the composition of the effluent from the column, said column having a liquid phase which volatilizes as a function of column temperature thereby producing variations in the detector output signal amplitude, a device for compensating for the variations in detector output signal amplitude resulting from predetermined temperature variations of the liquid phase comprising means for generating an electrical signal that varies in amplitude as a function of time, and means for varying the amplitude-time relationship of said generated signal to simulate the amplitude variations produced by said predetermined temperature variations in the absence of a sample, and means for subtracting said generated electrical signal from said detector output signal, thereby to provide a compensated detector output signal.

4. The combination set forth in claim 3 in which said generating means includes a pulrality of adjustable potential sources, a potentiometer having a tapped impedance element and a wiper, means for connecting each of the taps of said impedance element to a different one of said potential sources, means for varying the position of said wiper on said impedance element as a function of time, and means for subtracting the electrical signal appearing on said wiper from said detector output signal.

5. In a gas chromatograph for sample analyses, said chromatograph having a separating column and a gas detector for providing an output electrical signal whose amplitude varies in accordance with the composition of the effluent from the column, said column having a liquid phase which volatilizes as a function of column temperature thereby producing variations in the detector output electrical signal amplitude, a device for compensating for the variations in detector output signal amplitude resulting from predetermined temperature variations in the liquid phase comprising an oven enclosing said column, means for varying the temperature of said oven as a predetermined function of time, means responsive to the temperature of said oven for generating an electrical signal simulating the temperature-produced variations in said detector output signal in the absence of a sample, and means for combining said generated electrical signal and said detector output signal in opposition, thereby to provide a compensated detector output signal substantially free from said column temperature-produced amplitude variations.

6. The combination set forth in claim 5 wherein said means for generating said signal includes a temperature transducer for providing an output signal having an amplitude proportional to said transducer temperature, an amplifier coupled to said transducer for amplifying said output signal, a servo motor connected to be actuated by said amplifier, and a function generator responsive to said servo motor for generating an electrical output signal that varies in amplitude as a function of said oven temperature.

7. The combination set forth in claim 6 wherein said function generator comprises a plurality of adjustable potential sources, a potentiometer having tapped impedance element and a wiper, means for connecting each of the taps of said impedance element to a different one of said potential sources, and means for varying the position of said wiper on said impedance element as a function of time.

8. In a gas chromatograph for analyzing samples, said chromatograph having a separating column and a gas detector for providing an output electrical signal whose amplitude varies in accordance with the composition of the effluent from the column, said column having a liquid phase which volatilizes as a function of column temperature thereby producing unwanted but repeatable variations in the detector output electrical signal amplitude, the combination of means for storing the amplitude-time relationship of said detector output signal, means responsive to said storing means for generating an electrical signal whose amplitude varies as a function of time in the same manner as said detector output signal in the absence of a sample, and means for combining said generated signal and said detector output signal in opposition, thereby to provide a compensated detector output signal substantially free from said column temperature-produced variations.

9. In a gas chromatograph having a separating column and a gas detector for providing an output electrical signal whose amplitude varies in accordance with the composition of the effluent from the column, said column having a liquid phase which volatilizes as a function of column temperature thereby producing unwanted variations in the detector output signal amplitude, the method of compensating for the effects of said liquid phase volatilization on said detector output signal amplitude, comprising the steps of generating an electrical signal simulating said temperature-produced variations in said detector output signal, and combining said generated electrical signal with said detector output signal in opposition.

10. In a gas chromatograph having a separating column and a gas detector for providing an output electrical signal whose amplitude varies in accordance with the composition of the effluent from the column, said column having a liquid phase which volatilizes as a function of column temperature thereby producing variations in the detector output signal amplitude, the method of compensating for the effects of said liquid phase volatilization on said detector output signal amplitude, comprising the steps of determining the relationship between said detector output signal amplitude and said temperature variations, generating an electrical signal simulating said temperature-produced variations, and subtracting said generated electrical signal from said detector output signal.

11. In a gas chromatograph having a separating column and a gas detector for providing an output electrical signal whose amplitude varies in accordance with the composition of the effluent from the column, said column having a liquid phase which volatilizes as a function of column temperature thereby producing variations in the detector output signal amplitude, the method of compensating for the effects of said liquid phase volatilization on said detector output signal amplitude, comprising the steps of varying the temperature of said column as a predetermined function of time, measuring the variations in detector output signal amplitude occurring as a function of time, generating an auxiliary electrical signal corresponding to said detector output signal amplitude variations, and subtracting said generated signal from said detector output signal.

References Cited by the Examiner

UNITED STATES PATENTS 3,094,862  6/1963  Burk _____ 73—23.1

RICHARD C. QUEISSER, *Primary Examiner.*